US009616992B2

(12) United States Patent
Belmonte et al.

(10) Patent No.: US 9,616,992 B2
(45) Date of Patent: Apr. 11, 2017

(54) DEVICE FOR SUPPLYING AND DISTRIBUTING FLUID

(71) Applicant: SNECMA, Paris (FR)

(72) Inventors: Olivier Belmonte, Perthes en Gatinais (FR); Augustin Curlier, Melun (FR); Mathieu Perrier, Melun (FR)

(73) Assignee: SNECMA, Paris (FR)

( * ) Notice: Subject to any disclaimer, the term of this patent is extended or adjusted under 35 U.S.C. 154(b) by 678 days.

(21) Appl. No.: 14/093,779

(22) Filed: Dec. 2, 2013

(65) Prior Publication Data

US 2014/0154076 A1 Jun. 5, 2014

(30) Foreign Application Priority Data

Dec. 5, 2012 (FR) ..................................... 12 61685

(51) Int. Cl.
*B63H 3/02* (2006.01)
*B64C 11/30* (2006.01)
(Continued)

(52) U.S. Cl.
CPC ................ *B64C 11/38* (2013.01); *B63H 3/02* (2013.01); *B64C 11/308* (2013.01); *B64C 11/40* (2013.01);
(Continued)

(58) Field of Classification Search
CPC ..... B64C 11/30; B64C 11/305; B64C 11/306; B64C 11/308; B64C 11/34; B64C 11/36;
(Continued)

(56) References Cited

U.S. PATENT DOCUMENTS

2007/0212220 A1 9/2007 Perkinson et al.
2011/0002786 A1 1/2011 Perkinson
(Continued)

FOREIGN PATENT DOCUMENTS

| FR | 2 498 253 | 7/1982 | |
| FR | 2978122 A1 * | 1/2013 | ........... B64C 11/306 |
| GB | 544570 | 4/1942 | |

OTHER PUBLICATIONS

Preliminary Search Report issued Aug. 20, 2013 in French Application No. 1261685 (With English Translation of Category of Cited Documents).

*Primary Examiner* — Gregory Anderson
*Assistant Examiner* — Christopher R Legendre
(74) *Attorney, Agent, or Firm* — Oblon, McClelland, Maier & Neustadt, L.L.P.

(57) ABSTRACT

The device is intended to supply a rotating linear displacement actuator capable of controlling the pitch of the blades of a propeller, according to separate operating states, from a rotary power assembly, the device being arranged so as to be located between the power assembly and the actuator, along a longitudinal axis, and being connected in rotation therewith. According to the invention, the device comprises supplies for supplying fluid interacting with the power assembly and defining as many supplies as there are operating states of the actuator, and a fluid distributor to which the supplies are connected and having separate channels for transporting the fluid in the direction of the actuator according to the operating states, by a tubular equipment connected to the distributor.

9 Claims, 3 Drawing Sheets

(51) Int. Cl.
*B64C 11/38* (2006.01)
*B64C 11/40* (2006.01)
*B64D 27/00* (2006.01)
*F01D 7/00* (2006.01)

(52) U.S. Cl.
CPC .......... *F01D 7/00* (2013.01); *B64D 2027/005* (2013.01); *Y02T 50/66* (2013.01)

(58) Field of Classification Search
CPC ... B64C 11/38; B64C 11/40; B64D 2027/005; B63H 3/02; B63H 3/04; B63H 2003/006; F01D 7/00; F01D 7/02
See application file for complete search history.

(56) References Cited

U.S. PATENT DOCUMENTS

| | | |
|---|---|---|
| 2012/0079809 A1 | 4/2012 | Glynn et al. |
| 2014/0154076 A1* | 6/2014 | Belmonte ............... B64C 11/38 |
| | | 416/154 |
| 2016/0207609 A1* | 7/2016 | Belmonte ............... B64C 11/38 |

* cited by examiner

DEVICE FOR SUPPLYING AND DISTRIBUTING FLUID

The present invention relates to a device for supplying and distributing fluid for a fluid actuator such as a rotary linear actuator or the like, and to a system for adjusting the pitch of the blades of a turbine engine propeller, comprising an actuator of this type for controlling the pitch of the blades, the actuator being supplied by said device.

In the field of turbine engines for aircraft, it is known that the overall structure of the turbine engines, referred to as "open rotor" or "unducted fan", differs from that of conventional, turbojet-type turbine engines by the fan consisting of a pair of coaxial and counter-rotating propellers.

At present, two structural solutions have been developed, one with the pair of propellers arranged downstream of the turbine engine, the open rotor being referred to as a "pusher", and the other with the pair of propellers arranged upstream of the turbine engine, the open rotor being referred to as a "puller".

Without going into the advantages and disadvantages of these two solutions which in this case are not the subject of the invention, the pitch of the blades of the propellers can be controlled so as to allow optimal operation of the turbine engine according to the different operational phases encountered in flight and while on the ground.

For this purpose, a system for adjusting the blades is placed on each rotor and comprises, in particular, a control actuator making it possible to act on a connecting-rod transmission mechanism, which connecting rods act, in turn, on the rotary axes of the blades in order to modify the pitch angle thereof. The actuator of the adjusting system is controlled by a device which manages the supply of hydraulic fluid to the actuator, having two specific chambers connected directly to the actuator, the function of which is that of controlling the pitch of the blades of the propeller. This device, referred to as flight fine stop (FFS), makes it possible, by means of the adjusting system thus supplied with fluid, to vary the pitch of the propeller in question for the operational phases 1) in flight, for example between +90° and 30°, 2) on the ground and in reverse between +30° and −30°, and 3) a rapid return to 90°, when stationary and in the fully feathered position in the event of a malfunction in flight.

Therefore, three separate lines are required for managing the three operating states or phases corresponding to the desired pitch of the blades of the propeller.

In the solution with the pair of propellers downstream, where space is available in the direction of the nozzle, due to the fact that the gas generator portion is located upstream, the device consists of an integral, static assembly of a shaft which is used to transport hydraulic controls (supplies).

In the solution with the pair of propellers upstream, the installation of a static portion for the supply and distribution device is not possible, which complicates the deployment of the hydraulic supplies.

Indeed, the structural housing being located behind the two upstream propellers, it is impossible to place a static shaft between the control actuator and the housing, due to the presence of the power gear box (often referred to using the acronym PGB) which is a rotating power assembly, individually driving the propellers. That would lead to passing the static shaft through the PGB assembly. Thus, in the case of the solution with propellers upstream, since the structure of the gear box is of the differential type, that means that all the elements of which it is composed rotate, preventing any static connection between the upstream part of the turbine engine and the housing.

Moreover, US-2007/212220 discloses a device for supplying fluid which is located between the turbine shaft of a turbine engine and a linear displacement actuator for controlling the pitch of the blades of a propeller.

The aim of the present invention is that of providing a new solution to the problem of supplying the actuator intended, in the above-mentioned application, to control the adjustment of the blades of the propellers upstream of an open rotor puller.

For this purpose, the present invention relates to a device for supplying and distributing fluid for a rotating linear displacement actuator capable of controlling the pitch of the blades of a propeller, according to separate operating states, by means of a rotary power assembly, said device being arranged so as to be located between the power assembly and the actuator, along a longitudinal axis, whilst being connected in rotation therewith.

According to the invention, the device is remarkable in that it comprises:

means for supplying fluid comprising radial arms having internal passages capable of interacting with said power assembly and defining as many supplies as there are operating states of the actuator, a fluid distributor to which the internal passages of the arms of said supplies are connected, and having channels capable of separately transporting the fluid in the direction of the actuator according to the operating states, and tubular equipment connected coaxially to the distributor and forming at least two independent chambers which are connected to separate lateral channels of the distributor and one or the other of which are capable of being in communication with said actuator for two operating states thereof, said distributor comprising another central channel, along the common axis, capable of being in direct communication with a supply tube of the actuator for another operating state thereof.

Therefore, due to the device of the invention which is advantageously made to rotate by connecting the power assembly to the actuator, said actuator can be supplied by said arm means, and the fluid can be distributed in the device to the equipment to transport it, as needed, into the actuator, for the desired operation thereof (in the application in question, according to the operating states of the propeller).

The radial arms can thus be fixed simply to the cylindrical distributor, and the internal passage of each of said arms ends in an input cavity in connection with a supply tube passing through the power assembly and through an output cavity leading into the distributor.

For the fluid connection, the channels of the fluid distributor comprise compartments for receiving the output cavities of the radial arms, each compartment and the associated output cavity being interconnected in a sealed manner by a connecting end fitting. The simplicity of the production of the connection means and of the distributor ensuring great operating reliability during use is noteworthy.

Moreover, the tubular equipment is cylindrical, along the common axis, and is fixed at one end to one of the transverse faces of the distributor, facing towards the actuator, while the supply means are fixed to the other transverse face facing towards the power assembly.

Advantageously, the tubular equipment comprises two external and internal assembled tubular sleeves, defining between them an annular space in connection with one of the channels of the distributor, and surrounding a tubular control shaft of the actuator by forming, between said actuator and the internal sleeve, the two independent chambers, one chamber in connection with the annular space and the corresponding channel, and the other chamber in connection with a separate channel of the distributor.

In this case, one or the other of the two chambers are capable of being put in communication with an annular chamber located between the control shaft of the actuator and the supply tube of the actuator, through orifices made in the wall of said shaft.

In addition, at the end of the equipment opposite the end fixed to the distributor, the two sleeves are joined together by a connecting ring held axially in position.

The invention also relates to a system for adjusting the pitch of the blades of a turbine engine propeller, of the type comprising a rotary linear displacement actuator, driven in rotation by a power assembly and supplied by a device for supplying and distributing fluid according to the different operating states of the propeller, and a transmission mechanism connecting the actuator to the blades of the propeller to be controlled.

Advantageously, the device for supplying and distributing fluid is as defined according to any of the claims above, being arranged between the power assembly and the actuator, and connected in rotation therewith.

The figures of the appended drawings will demonstrate how the invention can be carried out.

Figure 1:
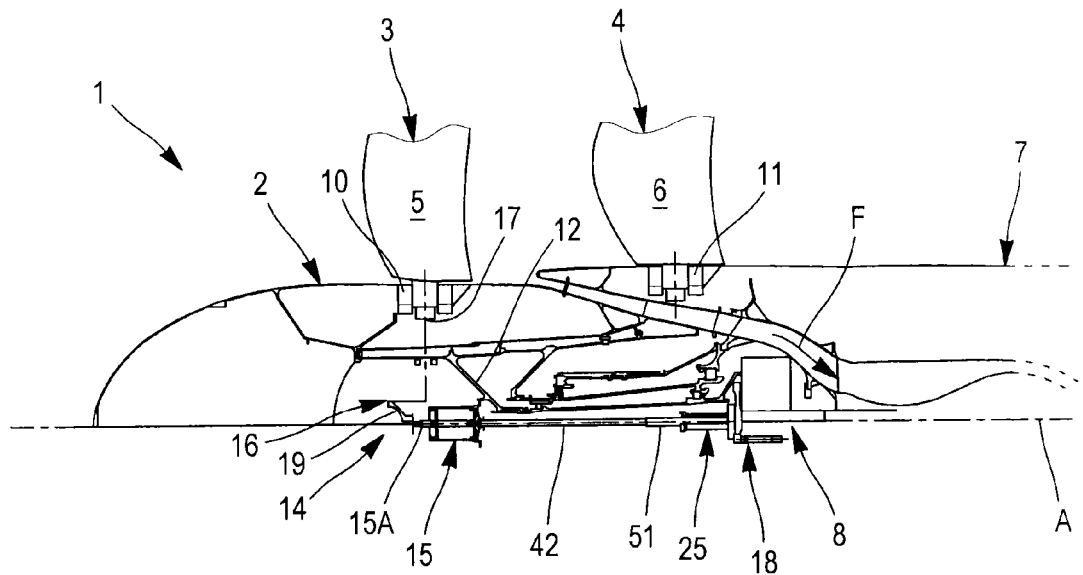
FIG. 1 is a schematic, partial, longitudinal sectional half view of a turbine engine having a pair of counter-rotating propellers located upstream of the turbine engine, the device for supplying and distributing fluid according to the invention connecting the power assembly driven by the turbine to the control actuator of the system for adjusting the blades of the corresponding propeller.

The turbine engine 1 shown in FIG. 1 is an upstream unducted fan turbine engine, known as an "open rotor puller", having a longitudinal axis A.

At the front 2 of the turbine engine 1, two coaxial and counter-rotating propellers 3, 4 are provided, forming the fan, and the blades 5, 6 of which have a variable pitch so as to be able to adapt to the different flight phases, including taxiing on the ground, described above, encountered by the aeroplane equipped with these turbine engines.

As indicated previously, the entire front tractive portion 2 of the turbine engine thus rotates about the axis A and is driven, for this purpose, by the gas generator portion 7, thus downstream, in which portion the compressors, combustion chamber and turbines (not shown) are ordinarily located. The stream of air entering the portion 7 is symbolised by arrows F.

A rotating power assembly 8 (PGB, power gear box) is connected to a turbine to drive the reverse rotation of the propellers, the roots of the blades 5, 6 of which are mounted in rotating ring compartments 10, 11 which are integral with respective rotating portions (cylindrical ferrules) 12 of the assembly 8.

The pitch of the blades of the upstream propeller 3 in question is variable due to a system 14 for adjusting the blades, designed to optimise the different operating states or phases of the aeroplane. In view of FIG. 1, the adjusting system 14 is rotary and comprises a controllable fluid actuator 15 and a connecting-rod 19 transmission mechanism 16 (in the portion shown), which rods connect the portion 15A which is movable in translation of the rotary actuator having rotating radial arms 17 for controlling the blades 5 of the propeller. The blades 6 of the other downstream propeller 4 also have a pitch which can be varied by a separate adjusting system to that of the upstream propeller.

In particular, the fluid actuator 15 is, for example, a rotary control actuator arranged on the axis A and connected firstly to the power assembly 8 and secondly, by the sliding movable part 15A thereof, to the corresponding ends of the connecting rods 19 of the transmission mechanism 16, of which the other ends are connected to the shafts 17 of the blades 5 (by crankpins (no reference sign)) for the purpose of adjusting them.

Advantageously, for supplying the rotating linear displacement actuator 15 with hydraulic fluid, a device 18 for supplying and distributing fluid is provided between the power assembly 8 and the actuator 15, with the supplies of oil passing through the power assembly, the cylindrical device being aligned coaxially with the rotary assembly and actuator. Thus, the upstream fan with the propellers 3, 4, the adjusting system 14 with the actuator 15 thereof and the transmission mechanism 16 thereof, the distributing device 18 and the power assembly 8 form a rotating unit defining one rotating position indicator or frame, as a result of which the blades 5 of the propeller 3 can be acted on by the adjusting system 14. It is thus possible to transport oil emanating from a fluid supply source located behind the assembly 8, in the portion 7 of the turbine engine, towards the device 18 located behind the control actuator and to manage, by sliding the actuator, the state restrictions linked to the pitch of the upstream propeller.

As recalled previously, the variation of the pitch of the blades of the propeller conforms to three separate operating states, such that the device of the invention must ensure connection between the hydraulic supply source, not visible in the figures, and the control actuator located downstream relative to the direction of circulation and of arrival of the fluid from the source.

Figure 2:
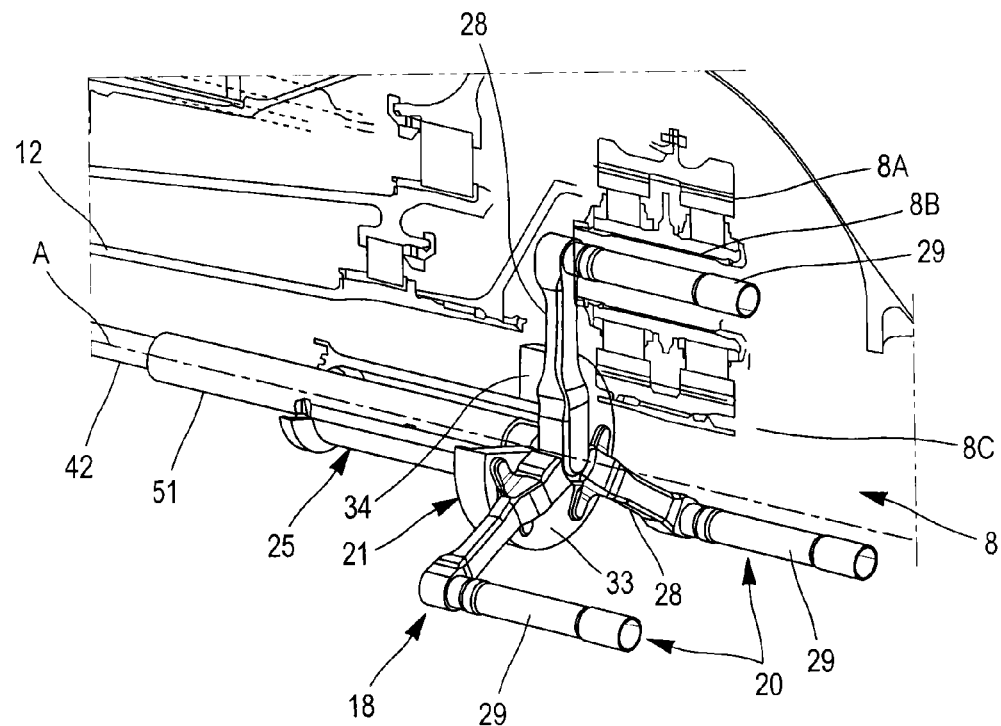
FIG. 2 is a perspective view of an embodiment of the supply and distribution device mounted between the power assembly and the actuator.
Figure 5:
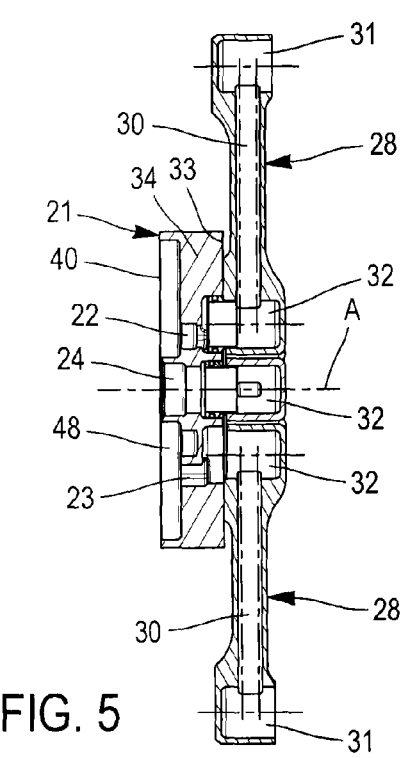
FIG. 5 is an axial section of the oil distributor of the device passing through two of the arms.

With further reference to FIGS. 2 and 5, the rotating device 18 comprises, in particular, three means 20 for supplying hydraulic fluid (for the three operating states of the propeller in question), in connection with the power assembly 8 illustrated in FIG. 2, and a fluid distributor 21 comprising three channels or passageways 22, 23, 24 for the fluid to which the supplies of the means 20 are connected. Two of the channels 22 and 23 are laterally offset from the axis A and communicate with tubular equipment 25 having two separate chambers 26, 27 connected to the actuator, while the third and last of the channels 24 is central, along the axis A, and communicates directly with the actuator.

The device 18 of the invention, the power assembly 8 and the actuator 15 are coaxial and aligned along the longitudinal axis A of the turbine engine 1 in order to render the unit as axisymmetrical as possible and to limit in particular the risks of imbalance.

Figure 3:
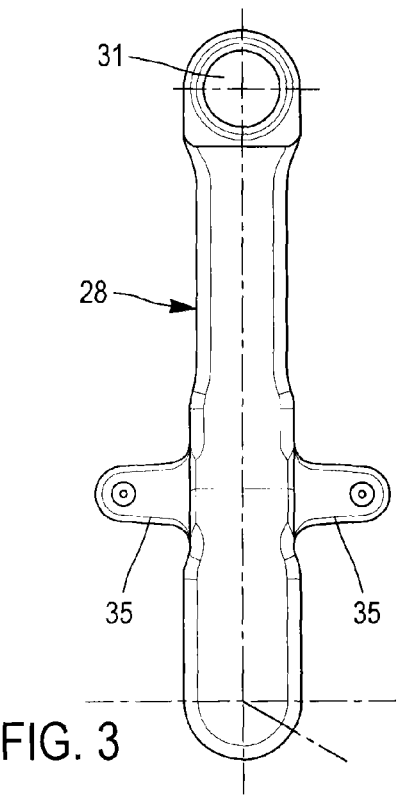
FIGS. 3 and 4 are front and longitudinal sectional views of one of the three arms for supplying the device with fluid.
Figure 4:
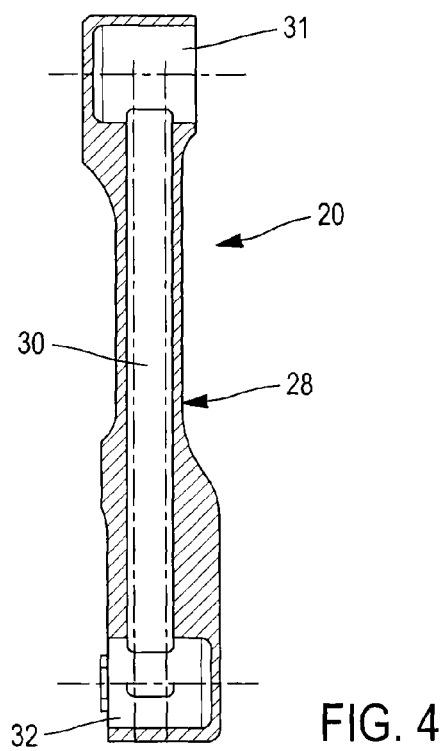

In particular, as shown in FIGS. 2, 3 and 4, the supply means 20 of the device 1 comprise three radial arms 28, preferably distributed mutually equiangularly relative to the longitudinal axis A. The radial arms 28 emanate from the cylindrical distributor 21, to extend externally to the power assembly 8, where it is desired for the supplies of oil to pass.

For this purpose, it is known that, in order to drive the counter-rotating propellers, the power assembly 8, often referred to using the acronym PGB (power gear box), comprises satellites 8A borne by retaining pins 8B which are connected to the satellite carrier 8C of the assembly. It is also advantageous to use these pins 8B which are hollow for passing, as supply means 20, tubes 29 therethrough which, on one side, not visible in the figures, are connected to the lubricant (oil) supply source by suitable channels and, on the other side, to the radial arms 28. Thus, the oil can be transported through the tubes 29 connected to the rotating assembly 8 up to the distributor 21.

For this purpose, as shown in FIG. 4, the radial arms 28 are hollow, with longitudinal internal passages 30 which end, on the outer side of the arms, in input cavities 31 of the fluid in which the ends in question of the supply tubes 29 engage in a fixed and sealing manner. On the inside, the passages 30 lead into the output cavities 32 which interact with the distributor 21, as will be seen later.

These input 31 and output 32 cavities are mutually parallel and perpendicular to the internal passages 30 of the radial arms 28 and, thus, parallel to the axis A.

In the example, two of the radial arms 28 establish two separate oil supply circuits from two pins 8B of the satellite carrier, these two circuits being intended for two of said operating states (in flight and on the ground in reverse for example) passing through the tubular equipment 25, which will be mentioned again later. The other remaining, longer, radial arm 28, establishes a third, separate supply circuit, from another available pin 8B of the satellite carrier, intended for the third operating state (stationary and in the fully feathered position).

As can be seen in FIG. 2, the supply tubes 29 are engaged in the input cavities 31 of the arms and introduced into the pins 8B of the satellite carrier of the power assembly 8. Moreover, the arms are positioned and fixed on the rear transverse face 33 of the wall 34 of the distributor 21 by fixing screws (not shown), passing through lateral lugs 35 provided along the radial arms, see FIG. 3.

Figure 6:
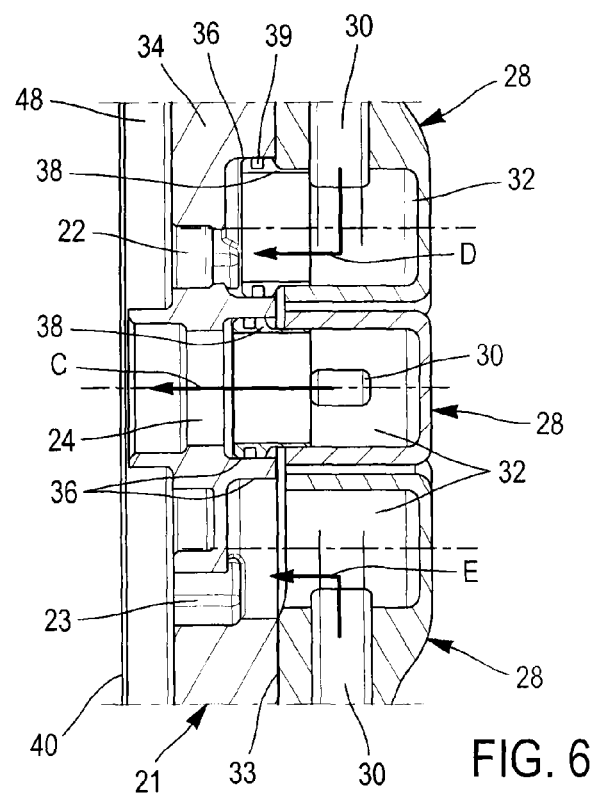
FIG. 6 is an enlarged view of the central portion of the distributor, with the three supply channels.

As shown in FIGS. 5 and 6, compartments 36 leading into the rear transverse face 33 for interacting coaxially with the output cavities 32 of the arms are made in the wall 34 of the distributor. These compartments 36 are cylindrical, mutually parallel along the axis A, and there are three of them. Two are radially distant from the axis A, the third being central, aligned along said axis A. In order to ensure the connection between the output cavities 32 and the respective compartments 36, annular connecting end parts 38 are provided, each engaging in the respective cavities and compartments in question. In FIG. 6, only two of the three connecting end parts 38 are shown, which are sealingly mounted in the compartments by joints 39.

The compartments 36 are in fact part of the channels 22, 23, 24 which pass through the cylindrical distributor 21 from the rear transverse face 33 facing towards the power assembly 8, to the front transverse face 40 facing towards the control actuator 15. Each channel of the distributor transports the oil from the corresponding radial supply arm, towards the circuit of the actuator which is allocated thereto to act in the desired operating state of the propeller.

To supply the actuator 15, a central supply tube 42 connects the distributor 21 of the device 18 to the rotary linear displacement actuator 15, coaxially with the axis A. In particular, it can be seen in particular in view of FIGS. 7 and 8 that the corresponding end of the supply tube 42 engages in the central channel 24 of the distributor to a stop 43 provided therein, while the opposite end thereof is integral with the actuator, while communicating with a relevant chamber thereof. The tube 42 is thus fixed in position with sealing between the central channel 24 of the distributor and the actuator. An arrow C marks the circuit or path of the oil coming from the central channel 24 of the device in the supply tube of the actuator, and corresponds to a specific operating state (stationary and in the fully feathered position).

Figure 7:
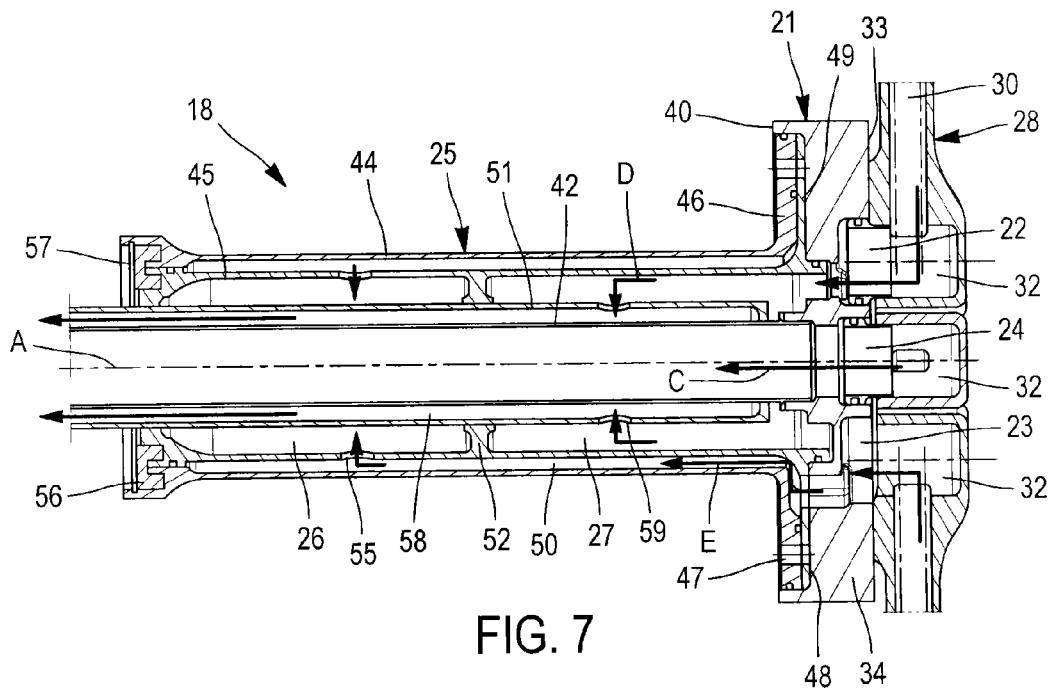
FIG. 7 is a longitudinal sectional view of the device showing the separate channels or passageways for the fluid from the distributor to the control actuator.

In contrast, as shown in FIGS. 2 and 7, in order to transport the oil from the lateral channels 22, 23, radially staggered from the central channel 24, the tubular equipment 25, concentric with the supply tube 42 of the actuator and, between the equipment and the tube, a tubular control shaft 51 of the actuator, surrounding the central supply tube 42 in order to define an annular control chamber 58 therebetween, and intended for two desired operating states of the propeller connected to the lateral channels, are provided. Arrows D and E mark the circuits or paths for the two other operating states of the propeller (in flight and on the ground in reverse) via the lateral channels 22, 23.

This equipment 25 is positioned against the front face 40 of the cylindrical distributor 21, perpendicular thereto, along the axis A, and comprises a double tubular sleeve composed of an external sleeve 44 and an internal sleeve 45, which are concentric and assembled to each other.

The external sleeve 44 ends, on one side, in an external annular flange or collar 46 capable of being positioned, by means of fixing screws which are not shown, but are symbolised by axis lines 47, in an annular recess 48 made in the front transverse face 40 of the wall 34 of the distributor. With regard to the internal sleeve 45, it extends, from the same side, by the corresponding end thereof which sealingly engages in an annular recess 48A provided in the bottom of the recess 48. An external annular collar 49 of the second sleeve marks the axial position thereof against the distributor, said collar 49 being caught between the flange 46 of the external sleeve 44 and the bottom of the recess 48 of the distributor.

At the ends thereof opposite the distributor, the two sleeves 44, 45 are joined together by a ring 56 ensuring that they are held in position and preventing the fluid circuit formed, due to centrifugal force, between the sleeves and the annular supply chamber 58, from opening, as will be seen later. This ring 56 is axially stopped by a resilient ring 57.

It can also be seen that, between the two external 44 and internal 45 sleeves, an annular space 50 is located, in communication with the most external lateral channel of the two lateral input channels, in this case the channel 22 of the distributor, circuit D. For this purpose, the lateral channel 22 leads into a machined shape 53 produced in the flange of the external sleeve to be followed by a crescent shape 54 made in the flange itself, as shown in FIGS. 8 and 9, and reaching as far as the annular space 50 between the sleeves.

Then, in FIG. 7, the two control chambers 26 and 27 are located between the internal sleeve 45 and the tubular shaft 51 and mutually separated by an annular partition wall 52 emanating from the wall of the internal sleeve, interacting in a sealing and sliding manner with said shaft. The annular control chamber 58 of the shaft is then located between the control shaft 51 and the supply tube 42.

These two separate, adjacent chambers are in communication, with regard to the distal chamber 26 of the distributor, with the annular space 50 through orifices or holes 55 made in the wall of the internal sleeve, and, with regard to the proximal chamber 27 of the distributor, with the corresponding channel 23 leading directly into the chamber 27 and with the chamber 58 through orifices or holes 59 made in the wall of the tubular shaft 51.

Figure 8:
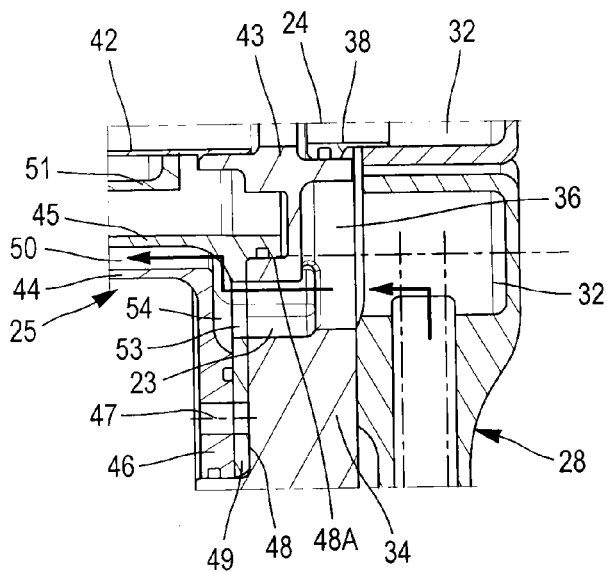
FIGS. 8 and 9 show in part, in an enlarged longitudinal sectional and perspective view, the supply of fluid (oil) to the equipment with sleeves from the distributor of the device.
Figure 9:
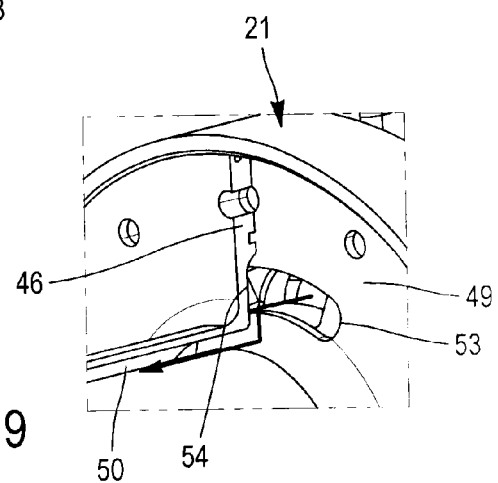

Thus, the lateral channel 23 leads into the proximal chamber of the distributor through the machined shape and the crescent shape 54, as shown in FIG. 8.

Functionally, the aim of each of the two chambers 26, 27 is that of supplying oil to the chamber 58 of the control shaft 51 of the actuator 15, even if only one of them can carry out this controlled supply.

The passage from one chamber to another, and thus from one operating state to another for the purpose of varying the pitch of the blades of the propeller by means of the system 14, is carried out by managing the pressures present in the lateral channels of the distributor, and the position of the orifices 59 provided on the control shaft of the actuator. As a reminder, the two chambers 26, 27 have the function of supplying the chamber 58 of the control shaft 51 of the actuator with oil, only one of them being able to carry out this supply for one of the two operating states in question. The linear displacement of the rotating actuator as a result of the fluid action of the supply circuit in use drives, by means of the adjusting system 14, the variation of the angle of the blades of the propeller 3.

Without going into detail about the operation of the actuator independent from the device of the invention, the central tube 42 is directly supplied by the channel 24, arrow C, for the operating state in question, and the oil arrives in the chamber in question of the actuator.

For the two other operating states, the annular chamber 58 is supplied by one or the other of the chambers 26, 27 in order to supply the other chamber of the actuator 15. In order to pass from the in-flight operating state to the operating state of on the ground and in reverse, the partition wall must be crossed by pressurising the two chambers 26, 27 (by means of the channels 22, 23, arrows D, E). The geometry of the orifices 59 and that of the partition wall 52 (thickness less than the diameter of the orifices) create a "by-pass", allowing the orifices for passing the oil to cross the partition wall and to thus pressurise the chamber in question and change the angles of the propeller in the state in question.

Thus, by rendering the device of the invention 18 rotary by a connection with the power assembly 8, it is possible to supply the control actuator 15 of the adjusting system 14 of the blades of a propeller, so that it functions according to the three states in question, without causing an imbalance, whilst tolerating the centrifugal forces and the pressure connected to the hydraulic circuit.

The invention claimed is:

1. A device for supplying and distributing fluid for a rotating linear displacement actuator to control a pitch of blades of a propeller, according to separate operating states, through a rotary power assembly, said device being arranged so as to be located between the power assembly and the rotating linear displacement actuator, along a longitudinal axis, and being connected in rotation therewith, the device comprising:
   a supply mechanism to supply fluid comprising radial arms having internal passages to interact with said power assembly and to define as many supplies as there are operating states of the rotating linear displacement actuator,
   a fluid distributor to which the internal passages of the arms of said supplies are connected, and having separate channels to separately transport the fluid in a direction of the rotating linear displacement actuator according to the operating states of the rotating linear displacement actuator, and
   a tubular equipment connected coaxially to the distributor and forming two independent chambers, each of said two independent chambers being connected to one lateral channel among the separate channels of the distributor transporting the fluid, each of said two independent chambers to be selectively in communication with said rotating linear displacement actuator to select one of two operating states of the rotating linear displacement actuator, the distributor comprising another central channel among the separate channels, along a common axis, to be in direct communication with a supply tube of the rotating linear displacement actuator for another operating state of the rotating linear displacement actuator.

2. The device according to claim 1, wherein the radial arms are fixed to the distributor, and the internal passage of each of said arms ends in a respective input cavity in connection with a supply tube of the respective supply mechanism passing through the power assembly, and through a respective output cavity leading into the distributor.

3. The device according to claim 2, wherein the separate channels of the fluid distributor comprise compartments to receive output cavities of the radial arms, each compartment and the associated output cavity being interconnected in a sealing manner by a connecting end piece.

4. The device according to claim 1, wherein the tubular equipment is cylindrical, along the common axis, and fixed, at one end, to one of transverse faces of the distributor, facing towards the rotating linear displacement actuator, while the supply mechanism is fixed to another transverse face of the distributor facing towards the power assembly.

5. The device according to claim 1, wherein the tubular equipment comprises two assembled tubular sleeves, respectively external tubular sleeve and internal tubular sleeve, and defines between the external tubular sleeve and the internal tubular sleeve an annular space in connection with one of the separate channels of the distributor, and surrounds a tubular control shaft of the rotating linear displacement actuator by forming, between said rotating linear displacement actuator and the internal tubular sleeve, and also defining, the two independent chambers, one of the two independent chambers being in connection with the annular space and the corresponding separate channel connected to said annular space, and another of the two independent chambers being in connection with another of the separate channels of the distributor.

6. The device according to claim 5, wherein one or another of the two chambers are to be put in communication with an annular chamber located between the control shaft of the rotating linear displacement actuator and the supply tube of the rotating linear displacement actuator, through orifices made in a wall of said control shaft.

7. The device according to claim 5, wherein the two independent chambers are adjacent and mutually separated by a transverse partition wall emanating from the internal tubular sleeve or the control shaft.

8. The device according to claim 5, wherein, at an end of the tubular equipment opposite an end fixed to the distributor, the two assembled tubular sleeves are joined together by a connecting ring held axially in position.

9. A system for adjusting the pitch of the blades of a turbine engine propeller, comprising:
- a rotating linear displacement actuator, driven in rotation by a power assembly and supplied by the device to supply and distribute fluid as defined according to claim 1 and according to different operating states of the propeller, and
- a transmission mechanism connecting the actuator to the blades of the propeller to be controlled,
- wherein the device to supply and distribute fluid is arranged between the power assembly and the rotating linear displacement actuator and connected in rotation therewith.

* * * * *